United States Patent
Iwasaki

(10) Patent No.: US 10,530,945 B2
(45) Date of Patent: Jan. 7, 2020

(54) DISPLAY DEVICE AND DISPLAY SYSTEM

(71) Applicant: KYOCERA Documents Solutions Inc., Osaka (JP)

(72) Inventor: Shogo Iwasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 28 days.

(21) Appl. No.: 15/913,386

(22) Filed: Mar. 6, 2018

(65) Prior Publication Data
US 2018/0278769 A1   Sep. 27, 2018

(30) Foreign Application Priority Data

Mar. 23, 2017   (JP) .................................. 2017-057284

(51) Int. Cl.
| G06F 3/048 | (2013.01) |
| H04N 1/00 | (2006.01) |
| G06T 11/60 | (2006.01) |
| G06F 3/0481 | (2013.01) |

(Continued)

(52) U.S. Cl.
CPC ..... *H04N 1/00503* (2013.01); *G06F 3/04817* (2013.01); *G06T 11/00* (2013.01); *G06T 11/60* (2013.01); *G06T 19/006* (2013.01); *H04N 1/00411* (2013.01); *H04N 1/00514* (2013.01); *H04N 2201/0094* (2013.01)

(58) Field of Classification Search
CPC .... G06T 19/006; G06T 11/00; G06F 3/04817
See application file for complete search history.

(56) References Cited

U.S. PATENT DOCUMENTS

| 2007/0198184 A1 | 8/2007 | Yoshioka et al. ............ 701/211 |
| 2014/0078176 A1* | 3/2014 | Kim ........................ G06F 3/017 |
| | | 345/633 |
| 2014/0191928 A1 | 7/2014 | Kobayahi ........................ 345/8 |

(Continued)

FOREIGN PATENT DOCUMENTS

| CN | 103913842 A | 7/2014 |
| CN | 106383652 A | 2/2017 |

(Continued)

OTHER PUBLICATIONS

Chinese Office Action dated Jun. 19, 2019, issued by the State Intellectual Property Office in corresponding application CN 201810191361.7.

(Continued)

*Primary Examiner* — Keith D Bloomquist
(74) *Attorney, Agent, or Firm* — Stein IP, LLC

(57) ABSTRACT

A display device includes a display unit for displaying an image while enabling a user to see a target operation panel, a camera unit for taking an image of the target operation panel, a storage unit for storing display data if a button image simulating a button existing on a user specified panel, as well as correspondence relationship information defining a correspondence relationship between the button image and a target button existing on the target operation panel, and a control unit that determines the target button for which the corresponding button image is defined in the correspondence relationship information as a first button, and controls to display the button image corresponding to the first button so as to overlap the first button.

7 Claims, 10 Drawing Sheets

(51) Int. Cl.
     *G06T 19/00*      (2011.01)
     *G06T 11/00*      (2006.01)

(56) References Cited

U.S. PATENT DOCUMENTS

| | | | | |
|---|---|---|---|---|
| 2015/0202962 | A1* | 7/2015 | Habashima | B60K 35/00 |
| | | | | 345/633 |
| 2016/0092083 | A1* | 3/2016 | Korkus | H04N 21/4312 |
| | | | | 715/765 |
| 2016/0274762 | A1* | 9/2016 | Lopez | G06T 19/006 |
| 2018/0130260 | A1* | 5/2018 | Schmirler | G06T 19/006 |
| 2018/0218631 | A1* | 8/2018 | Wright | G06F 3/011 |

FOREIGN PATENT DOCUMENTS

| | | | |
|---|---|---|---|
| JP | 2007-206719 A | 8/2007 |
| JP | 2015-118556 A | 6/2015 |
| JP | 2016-110379 A | 6/2016 |

OTHER PUBLICATIONS

Japanese Office Action dated Sep. 3, 2019, issued by the Japanese Patent Office in corresponding application JP 2017-057284.

\* cited by examiner

CORRESPONDENCE RELATIONSHIP BETWEEN TARGET BUTTON AND BUTTON IMAGE

USER'S VIEWING MANNER
(BEFORE DISPLAYING PROCESS)

USER'S VIEWING MANNER
(AFTER DISPLAYING PROCESS)

DISPLAY DEVICE AND DISPLAY SYSTEM

INCORPORATION BY REFERENCE

This application is based upon and claims the benefit of priority from the corresponding Japanese Patent Application No. 2017-057284 filed Mar. 23, 2017, the entire contents of which are hereby incorporated by reference.

BACKGROUND

The present disclosure relates to a display device and a display system for supporting a user who operates an operation panel.

Conventionally, there is proposed a technique for supporting a user who operates an operation panel, by using a head mounted display. In the conventional technique, the operation panel and the head mounted display are configured to work in a cooperative manner, and a screen that cannot displayed on the operation panel at one time is divided into a main screen and a sub-screen. Then, the operation panel displays the main screen, and the head mounted display displays the sub-screen.

SUMMARY

A display device according to a first aspect of the present disclosure includes a display unit, a camera unit, a storage unit, and a control unit. The display unit displays an image while enabling a user to see a target operation panel that is an operation panel to be actually operated by the user. The camera unit takes an image of the target operation panel so as to output imaged data of the target operation panel. The storage unit stores display data of a button image simulating a button existing on a user specified panel that is an operation panel specified by the user, as well as correspondence relationship information defining a correspondence relationship between the button image and a target button that is a button existing on the target operation panel. The control unit recognizes the target button based on the imaged data of the target operation panel, determines the target button for which the corresponding button image is defined in the correspondence relationship information as a first button, and performs the displaying process of controlling the display unit to display the button image of the first button so as to overlap the first button.

A display system according to a second aspect of the present disclosure includes the display device described above, and a server. The server is connected to the display device in a communicable manner, and stores panel information indicating feature points of a plurality of types of registered operation panels each of which is an operation panel registered in advance, as well as the correspondence relationship information for each of the types of registered operation panels. The control unit extracts a feature point of the target operation panel from the imaged data of the target operation panel, sends to the server a request to send the correspondence relationship information corresponding to the registered operation panel having the same feature point as the target operation panel among the plurality of types of registered operation panels, and performs the displaying process based on the correspondence relationship information received from the server.

DETAILED DESCRIPTION

<Display System Structure>

Figure 1:
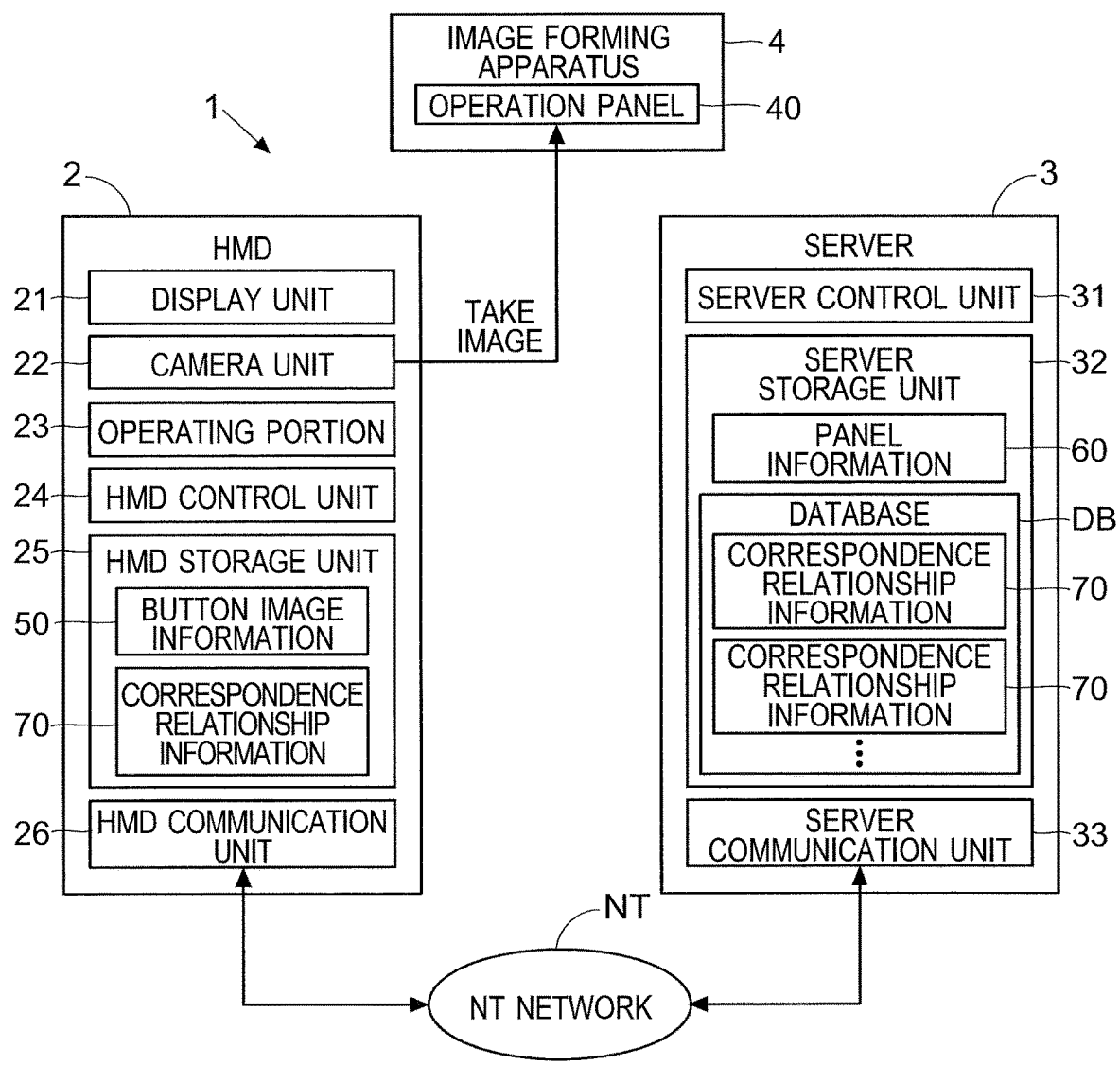
FIG. 1 is a diagram showing a structure of a display system according to one embodiment of the present disclosure.

As shown in FIG. 1, a display system 1 of this embodiment includes a head mounted display 2 and a server 3. The head mounted display 2 and the server 3 are connected to each other via a wide area network NT such as the Internet in a communicable manner. Note that the head mounted display 2 corresponds to a "display device". In the following description, the head mounted display is referred to as an HMD.

The HMD 2 is worn by a user of an image forming apparatus (a printing apparatus such as a multifunction peripheral or a copier). For example, the image forming apparatus is a multifunction peripheral having a plurality of functions such as a copy function, a transmission function for transmitting scanned data to an external apparatus, a box function for storing scanned data in itself, and a USB direct print function for printing data directly from a USB memory. In the following description, the image forming apparatus that is actually used by the user who wears the HMD 2 is denoted by numeral 4.

The HMD 2 is a glasses type and displays an image on a part corresponding to a lens of glasses (displays an image in front of a user's eye). In addition, the HMD 2 takes an image of a scene (object) in front of the user's eye. If the image forming apparatus 4 exists in front of the user's eye, the HMD 2 takes an image of the image forming apparatus 4.

The HMD 2 includes a display unit 21, a camera unit 22, an operating portion 23, an HMD control unit 24, an HMD storage unit 25, and an HMD communication unit 26. The HMD control unit 24 corresponds to a "control unit", and the HMD storage unit 25 corresponds to a "storage unit".

The display unit 21 is disposed at a position facing a user's eye when the user wears the HMD 2. Further, the display unit 21 displays various images in front of the user's eye. Although not particularly limited, an optically transparent type (optical see-through type) display device, which can transmit ambient light, is used as the display unit 21.

For example, the display unit 21 includes a half mirror, which reflects a display image toward the user's eye. In this case, ambient light passes through the half mirror and enters the user's eye. Therefore, even when the user wears the HMD 2 (when the HMD 2 is positioned in front of the user's eye), the user can see an external scene (object). In other words, the display unit 21 enables the user to see the scene in front of the eye as well as the displayed image.

The camera unit 22 includes a CCD camera and the like and is disposed at a position enabling to take pictures in the sight direction of the user wearing the HMD 2. The camera unit 22 outputs imaged data obtained by imaging. The operating portion 23 receives operations for various settings.

The HMD control unit 24 includes a CPU that works on a control program and data, and performs various processes for controlling the HMD 2. The HMD storage unit 25 includes a nonvolatile memory (ROM) and a volatile memory (RAM), and stores the program and data for the HMD control unit 24 (CPU) to work. When the user uses a panel operation support service described later, various processes about the panel operation support service are performed by the HMD control unit 24 in a state where button image information 50 and correspondence relationship information 70 are stored in the HMD storage unit 25.

The HMD communication unit 26 is a communication interface for connecting the HMD 2 to an external apparatus in a communicable manner and includes a communication circuit and the like. The HMD control unit 24 accesses to the network NT using the HMD communication unit 26 so as to communicate with the server 3 (transmit and receive information to and from the server 3). In addition, the HMD control unit 24 communicates with the image forming apparatus 4 using the HMD communication unit 26 (transmit and receive information to and from the image forming apparatus 4). A wireless communication conforming to a communication standard such as near field wireless communication or wireless LAN communication is performed between the HMD 2 and the image forming apparatus 4.

The server 3 includes a server control unit 31, a server storage unit 32, and a server communication unit 33. Note that the server 3 is managed by a provider of the panel operation support service described later.

The server control unit 31 includes a CPU that works on a control program and data and performs various processes for controlling the server 3. The server storage unit 25 includes a ROM and a RAM, and stores the program and data for the server control unit 31 to work. In addition, the server storage unit 32 also includes a large-capacity storage device such as an HDD. The storage device stores panel information 60 that is used for the panel operation support service described later and the correspondence relationship information 70.

The server communication unit 33 is a communication interface for connecting the server 3 to an external apparatus in a communicable manner, and includes a communication circuit and the like. The server control unit 31 accesses to the network NT using the server communication unit 33 so as to communicate with the HMD 2 (transmits and receives information to and from the HMD 2).

<Operation Panel>

Figure 2:
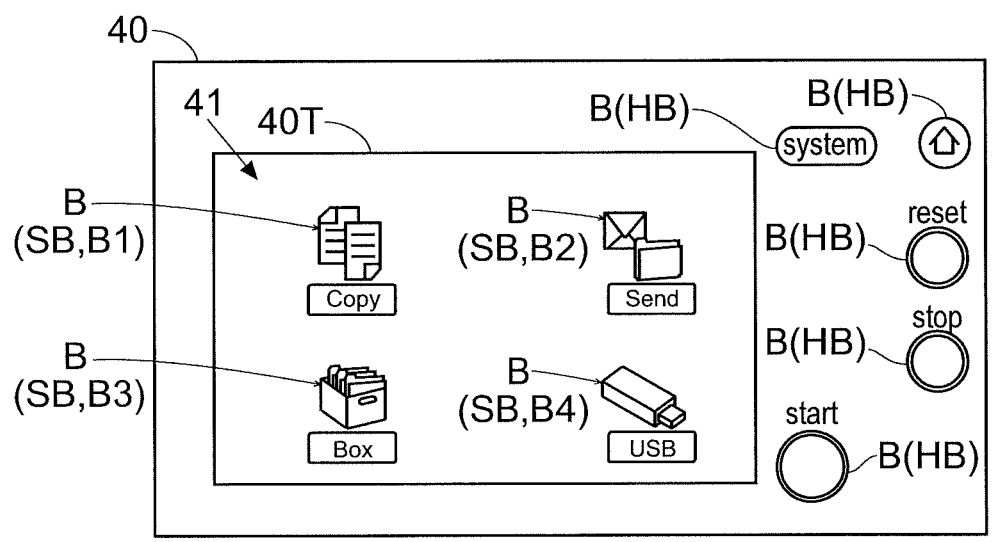
FIG. 2 is a diagram showing an operation panel that displays a function selection screen.
Figure 3:
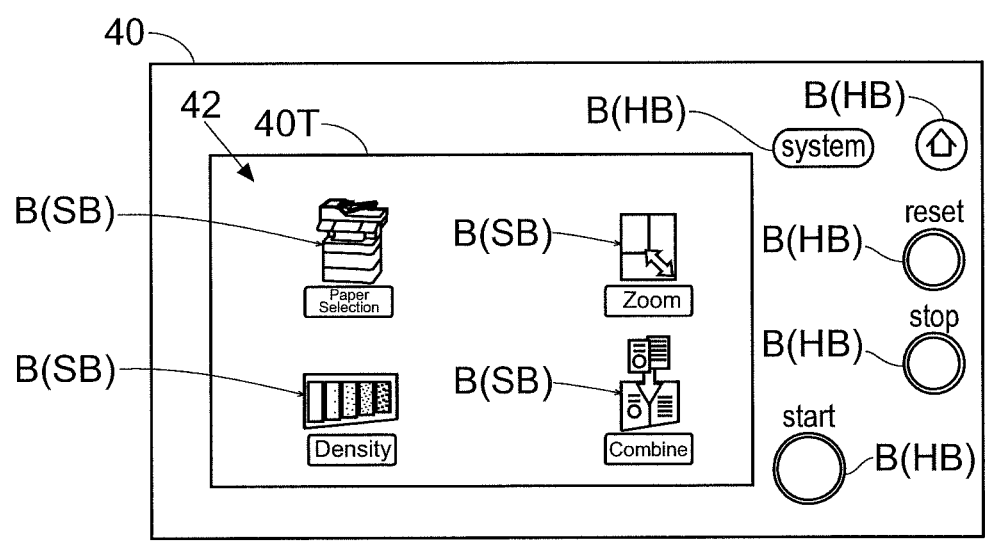
FIG. 3 is a diagram of the operation panel shown in FIG. 2, which displays an item selection screen.

The image forming apparatus 4 includes an operation panel 40 as shown in FIGS. 2 and 3. The operation panel 40 is operated by the user of the image forming apparatus 4 (the user wearing the HMD 2).

The operation panel 40 includes a plurality of buttons B for receiving various operations from the user. For example, the operation panel 40 receives from the user a selecting operation such as a function selecting operation for selecting a function to be used, or an item selecting operation for selecting a setting item of the selected function (setting item for which a set value can be changed). In addition, the operation panel 40 receives from the user an instruction operation for instructing to start or stop a job such as a copy job, or an instruction operation for instructing to reset a set value input to the operation panel 40. The above operations are examples, and other various operations are also received by the operation panel 40.

The buttons B existing on the operation panel 40 can have various configurations. There is a case where a software button (icon) is displayed on a touch panel display 40T provided to the operation panel 40, and a user's touch operation of the software button is received as the selecting operation or the instruction operation. Alternatively, there is a case where a user's operation of pressing a hardware button provided to the operation panel 40 is received as the selecting operation or the instruction operation. In the following description, a software button is denoted by symbol SB, and a hardware button is denoted by symbol HB, which are referred to as a software button and a hardware button. Note that the buttons B on the operation panel 40 shown in FIGS. 2 and 3 are examples, and the number of the buttons B, shapes of the same, and functions assigned to the buttons B are not particularly limited.

First, the software buttons SB displayed on the operation panel 40 are described.

The operation panel 40 displays a function selection screen 41 shown in FIG. 2 as an initial screen (home screen) after the image forming apparatus 4 is activated. The function selection screen 41 displays a plurality of software buttons SB for receiving a function selecting operation. As an example, FIG. 3 shows the function selection screen 41 displaying the four software buttons SB corresponding to a copy function (Copy), a transmission function (Send), a box function (Box), and a USB direct print function (USB). In the following description, the software button SB for the copy function may be denoted by symbol B1, the software button SB for the transmission function may be denoted by symbol B2, the software button SB for the box function may be denoted by symbol B3, and the software button SB for the USB direct print function may be denoted by symbol B4.

When the operation panel 40 receives a touch operation of one of the software buttons SB on the function selection screen 41 (when a function is selected), the operation panel 40 displays an item selection screen 42 (see FIG. 3) for receiving an item selecting operation for selecting a setting item of the selected function. The item selection screen 42 displays a plurality of software buttons SB for receiving an item selecting operation.

For example, it is supposed that the user selects the copy function. In this case, the item selection screen 42 of the copy function as shown in FIG. 3 is displayed on the operation panel 40. The item selection screen 42 of the copy function displays a plurality of software buttons SB for receiving an item selecting operation. As an example, FIG. 3 shows the item selection screen 42 displaying the four software buttons SB corresponding to setting items of sheet selection, zoom, density, and combine.

When the operation panel 40 receives a touch operation of one of the software buttons SB on the item selection screen 42 (when a setting item is selected), the operation panel 40 displays a setting screen (not shown) for setting a set value of the selected setting item. For example, when the user selects the sheet selection, the operation panel 40 displays a setting screen for setting size of a paper sheet to be used for the job.

Next, the hardware button HB disposed on the operation panel 40 is described.

A start button, a stop button, and a reset button are disposed as the hardware buttons HB on the operation panel 40. The start button and the stop button are hardware buttons HB for receiving an execution instruction and a stop instruction of a job, respectively. The reset button is the hardware button HB for receiving a reset instruction of the set value input to the operation panel 40.

Further, a home button (button with a mark of a house) and a system button (button with a character string "system") are disposed as the hardware buttons HB on the operation panel 40. When the home button is pressed, the display screen on the operation panel 40 is changed to the function selection screen 41 (i.e. the home screen). When the system button is pressed, a system menu (not shown) is displayed on the operation panel 40.

<Panel Operation Support Service>

Positions and shapes of the buttons existing on the operation panel (including patterns of the icons as the software buttons) are different depending on manufacturers of the image forming apparatus. Even the same manufacturer, positions and shapes of the buttons existing on the operation panel are different depending on types of the image forming apparatus (which functions are available).

Therefore, a user, who is accustomed to an operation panel of a certain image forming apparatus (referred to as an operation panel A in this description), may feel difficult to use an operation panel of another image forming apparatus (referred to as an operation panel B in this description). It is because positions and shapes of the buttons existing on the operation panel B are different from those on the operation panel A. For example, when a user who is accustomed to the operation panel A wants to perform copy using an image forming apparatus with the operation panel B, in a case where a position or a shape of a copy function button (button for receiving the function selecting operation) is different between the operation panel A and the operation panel B, it may take time to find the copy function button.

In this case, using a panel operation support service, operability can be improved. For example, by obtaining a dedicated application program from a panel operation support service provider and by installing the application program in the HMD 2, the panel operation support service can be used.

In order to provide the panel operation support service to users, the button image information 50 is generated by the service provider and is stored in advance in the HMD storage unit 25 of the HMD 2 that is used by the user who is provided with the panel operation support service (see FIG. 1). The button image information 50 includes button image display data in which buttons existing on a user specified panel that is an operation panel specified by the user (operation panel to which the user is accustomed) are simulated.

For example, the button image information 50 includes the button image display data that simulate software buttons (icons) that the user specified panel can display. Note that it is not necessary to generate the button image display data corresponding to all the software buttons that the user specified panel can display, but only the display data of the button image corresponding to the software button selected by the user may be generated and included in the button image information 50. In addition, the button image display data that simulate a hardware button disposed on the user specified panel may be included in the button image information 50.

In addition, the server 3 managed by the panel operation support service provider stores the panel information 60 indicating feature points of a plurality of types of registered operation panels of different manufacturers and specifications, which are operation panels registered by the service provider in advance (see FIG. 1). The panel information 60 defines feature points such as a contour of the operation panel, shapes and colors of the buttons, a symbol (including character and number) assigned to the button, and positions of the buttons, for each of the plurality of types of registered operation panels.

Further, the server 3 stores the correspondence relationship information 70 that defines correspondence relationship between a button image simulating a button existing on the user specified panel and a button existing on the registered operation panel (see FIG. 1). Note that the correspondence relationship information 70 is prepared for each of the registered operation panels, and a plurality of correspondence relationship information 70 corresponding to the plurality of types of registered operation panels are stored in a database DB.

For example, when the user specified panel has the copy function button (referred to as copy button in this description), the button to which the same function as the copy button of the user specified panel is assigned among buttons existing on the registered operation panel is defined as the button corresponding to the button image of the copy button. A corresponding button image is not defined for a button that exists on the registered operation panel but does not exist on the user specified panel. In addition, as to a button on the user specified panel that is not on the registered operation panel, a button corresponding to the button image of the button on the registered operation panel is not defined.

When being provided with the panel operation support service, the user wears the HMD 2 and approaches the operation panel that the user want to operate actually (the user sees the operation panel). In the following description, it is supposed that the operation panel that the user wants to operate actually is the operation panel 40 (see FIGS. 2 and 3). In this case, the operation panel 40 corresponds to a "target operation panel", and the operation panel 40 is referred to as the target operation panel 40 in the following description.

Figure 4:
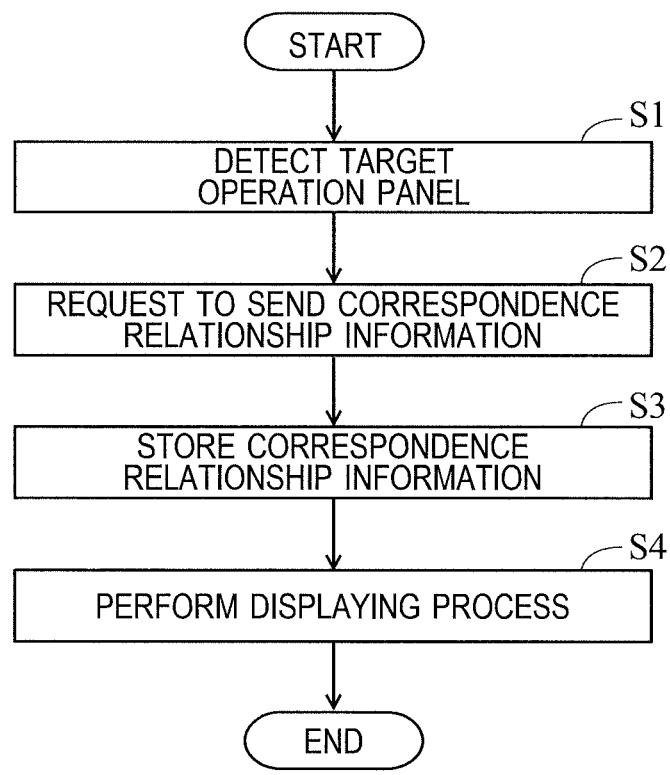
FIG. 4 is a diagram showing a flow of a process performed by the display system according to one embodiment of the present disclosure.

When the user approaches the target operation panel 40, the camera unit 22 of the HMD 2 takes an image of the target operation panel 40, and imaged data of the target operation panel 40 is output from the camera unit 22 to the HMD control unit 24. Then, in case where the application of the panel operation support service is activated, the process according to the flowchart shown in FIG. 4 is performed by the HMD control unit 24.

Specifically, in Step S1, the HMD control unit 24 detects the target operation panel 40 in the imaged data. For example, the HMD control unit 24 performs a predetermined image recognition process (including a character recognition process) on the imaged data so as to detect the target operation panel 40. In addition, in this case, the HMD control unit 24 extracts feature point information indicating feature points of the target operation panel 40 (e.g. a contour of the target operation panel 40, shapes and colors of the buttons B, symbols assigned to the buttons B, positions of the buttons B, and the like).

Further, in Step S2, the HMD control unit 24 sends to the server 3 a request to send the correspondence relationship information 70 corresponding to the registered operation panel having the same feature point as the target operation panel 40. In this case, the HMD control unit 24 allows the request to send to include the feature point information indicating the feature points of the target operation panel 40. When receiving the request to send, the server 3 recognizes the registered operation panel having the same feature point as the target operation panel 40 (the feature points indicated in the feature point information) based on the panel information 60, extracts the correspondence relationship information 70 corresponding to the recognized registered operation panel from the database DB, and sends the extracted correspondence relationship information 70 to the HMD 2.

When the HMD 2 receives the correspondence relationship information 70 from the server 3, the HMD control unit 24 stores the correspondence relationship information 70 received from the server 3 in the HMD storage unit 25 in Step S3. Note that the HMD control unit 24 recognizes the registered operation panel corresponding to the correspondence relationship information 70 stored in the HMD storage unit 25 as the target operation panel 40. After that, in Step S4, the HMD control unit 24 performs a displaying process based on the correspondence relationship information 70 stored in the HMD storage unit 25.

The displaying process performed by the HMD control unit 24 is described below.

First, with reference to FIG. 5, the correspondence relationship between the button B existing on the target operation panel 40 (hereinafter referred to as a target button B) and the button image is described using an example of the target buttons B (B1 to B4) displayed on the target operation panel 40 shown in FIG. 2. In the following description, the button image is denoted by numeral 100.

Figure 5:
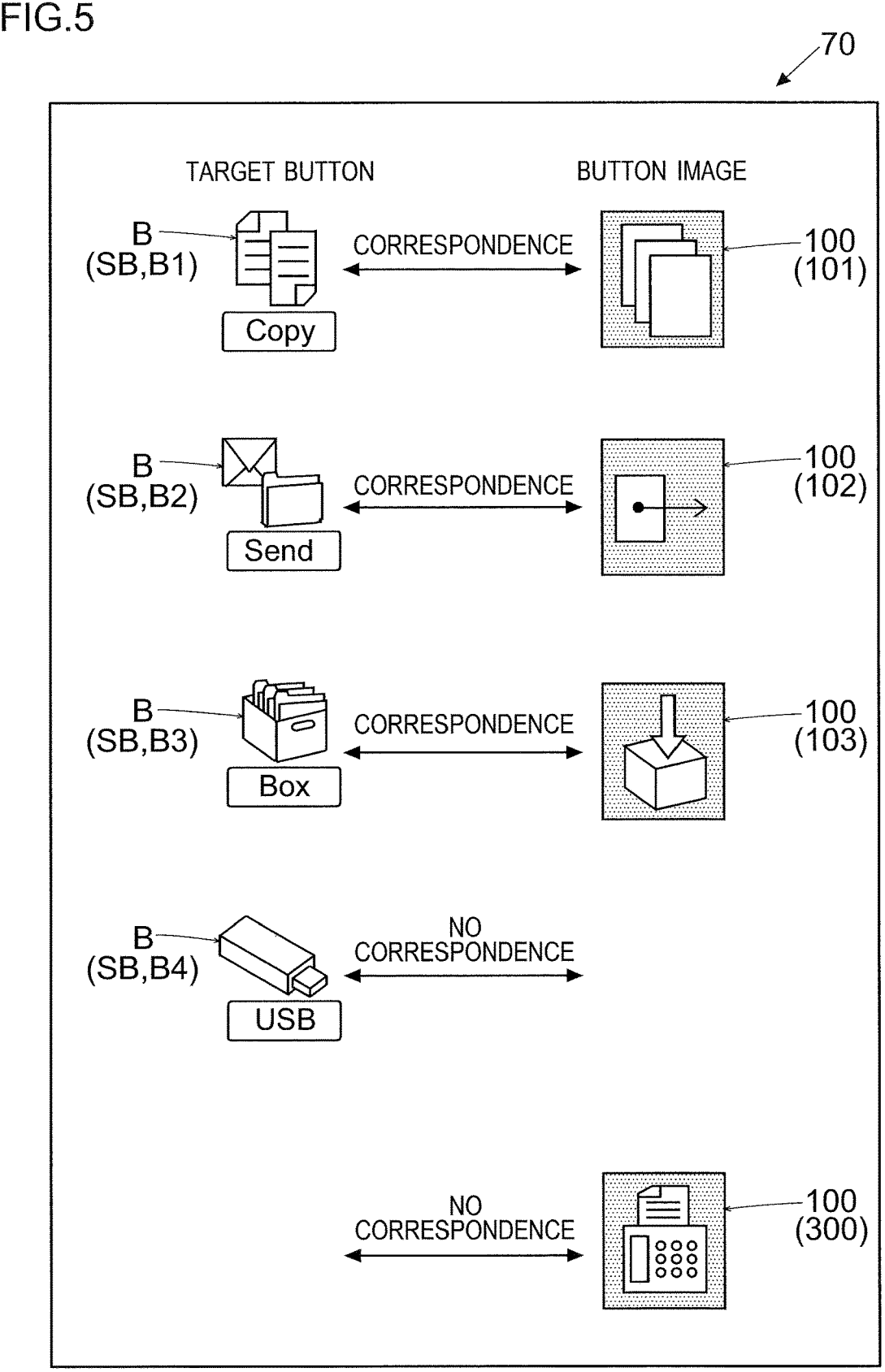
FIG. 5 is a diagram for describing correspondence relationship information that is used in a displaying process performed by the display system according to one embodiment of the present disclosure.

In the example shown in FIG. 5, among the target buttons B existing on the target operation panel 40, the target button B1 of the copy function, the target button B2 of the transmission function, and the target button B3 of the box function are corresponded to the button image 100. The target button B1 of the copy function corresponds to a button image 101, the target button B2 of the transmission function corresponds to a button image 102, and the target button B3 of the box function corresponds to a button image 103.

In addition, in the example shown in FIG. 5, the target button B4 of the USB direct print function is not corresponded to the button image 100. In other words, there is no button on the user specified panel that has the same function as the target button B4 on the USB direct print function.

Further, in the example shown in FIG. 5, there is the button image 100 to which no target button B is corresponded. The button image 100 is an image simulating the button of a facsimile function existing on the user specified panel. The fact that there is the button image 100 to which no target button B is corresponded means that a button having the same function as the button on the user specified panel as a base of the button image 100 does not exist on the target operation panel 40.

Next, with reference to FIGS. 6 to 10, the displaying process performed by the HMD control unit 24 is described. In the following description, it is supposed that the function selection screen 41 shown in FIG. 2 is displayed on the target operation panel 40.

(Button Image Display)

When performing the displaying process, the HMD control unit 24 recognizes the target button B existing on the target operation panel 40 based on the imaged data of the target operation panel 40 taken by the camera unit 22. Then, the HMD control unit 24 performs a first determination process in which the target button B for which the corresponding button image 100 is defined in the correspondence relationship information 70 stored in the HMD storage unit 25 is determined as a first button. For example, the HMD control unit 24 regards the target button B (software button SB) displayed on the target operation panel 40 as a determination target of the first determination process.

As a result of performing the first determination process, in case where the target button B determined as the first button exists on the target operation panel 40, the HMD control unit 24 performs a process of controlling the display unit 21 to display the button image 100 corresponding to the target button B determined as the first button so as to overlap the target button B. In this way, the user sees as if the target button B (first button) is replaced with the button existing on the user specified panel.

Figure 6:
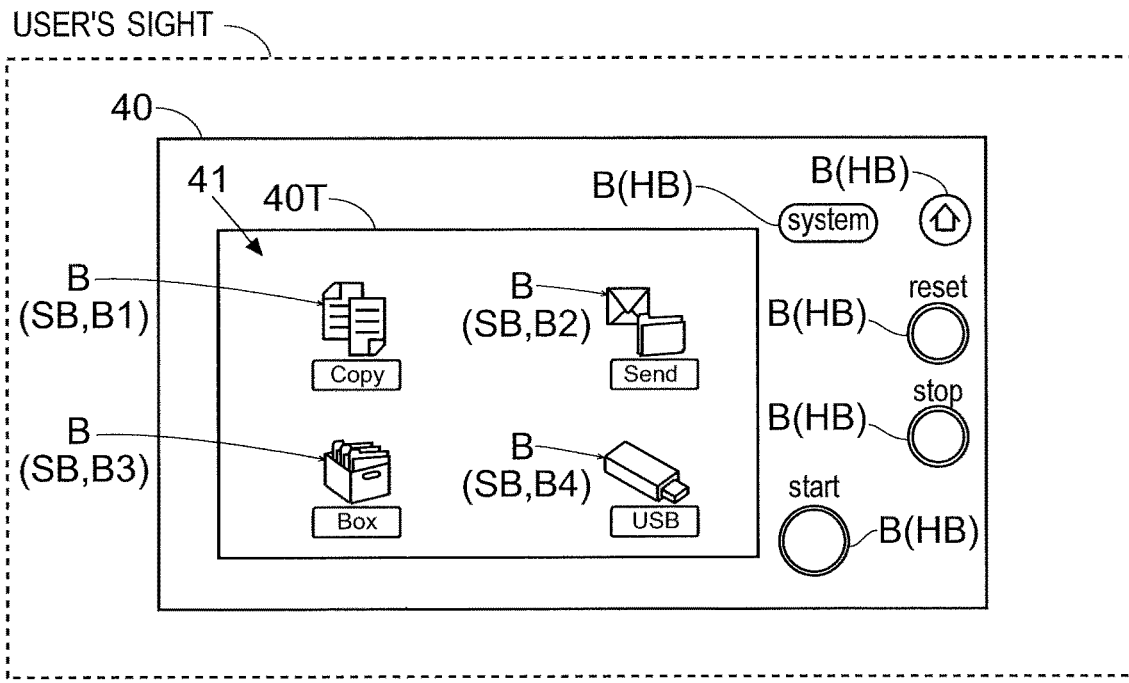
FIG. 6 is a diagram showing a user's viewing manner when the display system according to one embodiment of the present disclosure is performing the displaying process.
Figure 6:
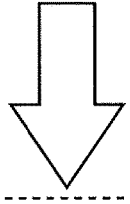
Figure 6:
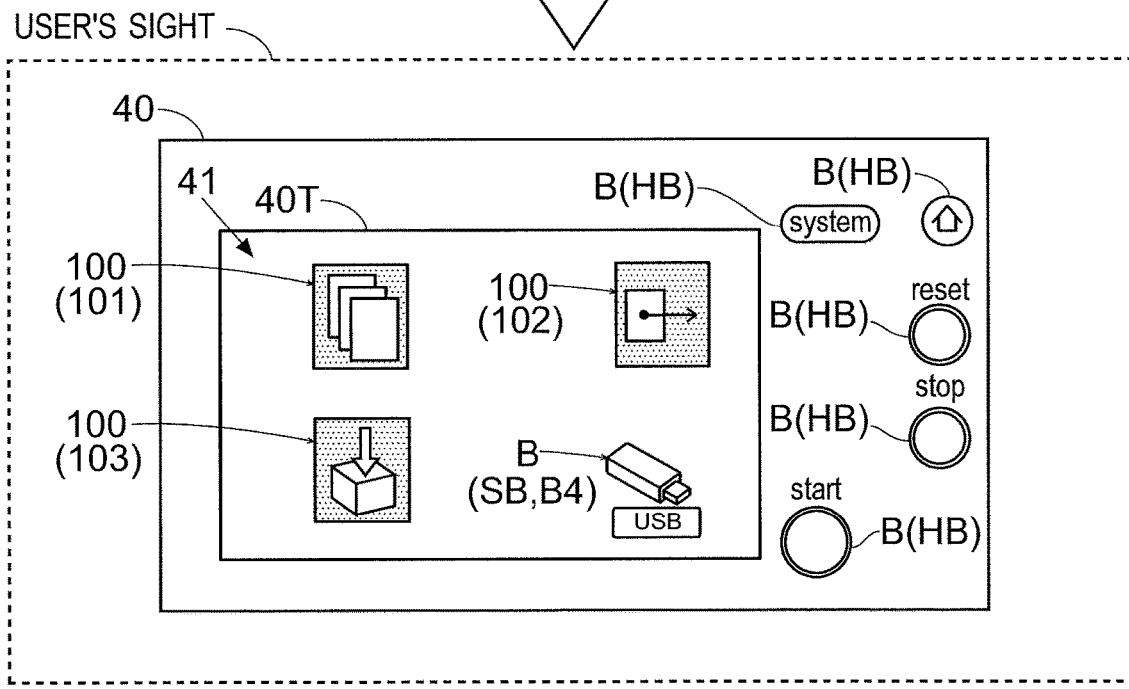

For example, it is supposed that the HMD control unit 24 performs the first determination process based on the correspondence relationship information 70 shown in FIG. 5. In this case, among the target buttons B existing on the target operation panel 40 (target buttons B to be the determination targets of the first determination process), the target buttons B1 to B3 are determined as the first button by the HMD control unit 24. Then, the user sees as shown in FIG. 6. In FIG. 6, a user's sight is shown by a broken line.

In a stage before the displaying process is performed by the HMD control unit 24, as shown in the upper part of FIG. 6, the user sees the target buttons B existing on the target operation panel 40 as they are. After that, the HMD control unit 24 performs the displaying process, and then as shown in the lower part of FIG. 6, the button image 101 is displayed so as to overlap the target button B1 in front of the user's eye, the button image 102 is displayed so as to overlap the target button B2 in front of the user's eye, and the button image 103 is displayed so as to overlap the target button B3 in front of the user's eye.

(Notification Image Display)

When performing the displaying process, the HMD control unit 24 performs a second determination process in which the target button B for which the corresponding button image 100 is not defined in the correspondence relationship information 70 stored in the HMD storage unit 25 is determined as a second button. For example, the HMD control unit 24 regards the target button B (software button SB) displayed on the target operation panel 40 as a determination target of the second determination process.

As a result of performing the second determination process, in case where the target button B determined as the second button exists on the target operation panel 40, the HMD control unit 24 performs a process of controlling the display unit 21 to display a notification image 200 (see the lower part of FIG. 7) for notifying the user that there is a button that does not exist on the user specified panel but exists on the target operation panel 40. In this case, the display unit 21 displays the notification image 200 so as to overlap the target button B determined as the second button by the HMD control unit 24. Note that the display data of the notification image 200 is stored in the HMD storage unit 25 in advance. When the notification image 200 is displayed, the user sees as if the notification image 200 is attached to the target button B (second button). In other words, the user recognizes the button that exists on the target operation panel 40 but does not exist on the user specified panel.

Figure 7:
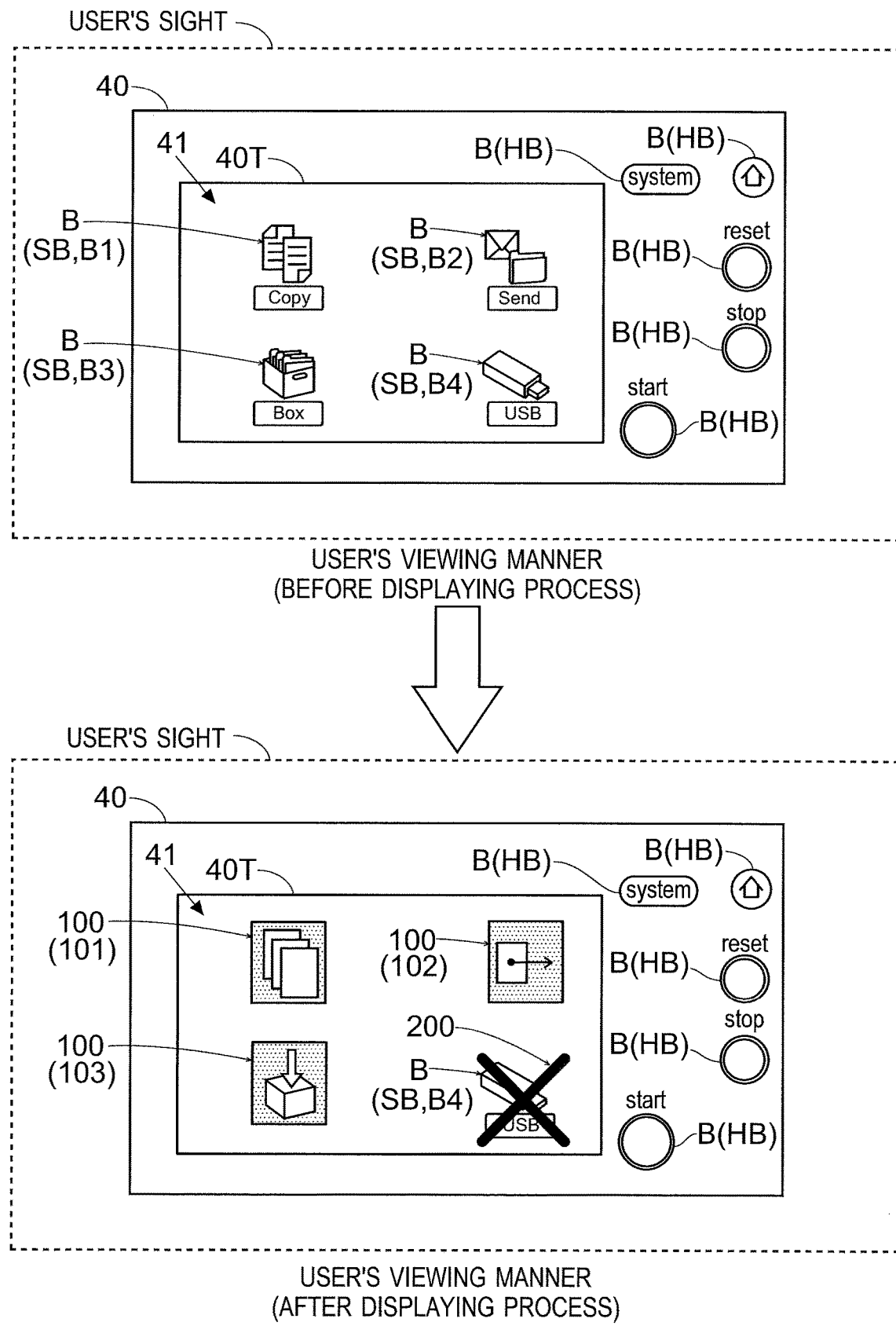
FIG. 7 is a diagram showing a user's viewing manner when the display system according to one embodiment of the present disclosure is performing the displaying process.

For example, it is supposed that the HMD control unit 24 performs the second determination process based on the correspondence relationship information 70 shown in FIG. 5. In this case, among the target buttons B existing on the target operation panel 40 (target buttons B to be the determination targets of the second determination process), the target button B4 is determined as the second button by the HMD control unit 24. Then, the display seen by the user is changed as shown in FIG. 7. In FIG. 7, the user's sight is shown by a broken line.

In a stage before the displaying process is performed by the HMD control unit 24, as shown in the upper part of FIG. 7, the user sees the target buttons B existing on the target operation panel 40 as they are. After that, the HMD control unit 24 performs the displaying process, and then as shown in the lower part of FIG. 7, the notification image 200 is displayed so as to overlap the target button B4 in front of the user's eye. The notification image 200 shown in the lower part of FIG. 7 is one example, and a shape and a color of the notification image 200 are not particularly limited.

Note that the second determination process may not be performed. In other words, the notification image 200 may not be displayed. The lower part of FIG. 7 shows one example in which the button images 100 and the notification image 200 are displayed.

(Unsupported Button Image Display)

When performing the displaying process, the HMD control unit 24 performs an unsupported button determination process in which the button image 100 for which the corresponding target button B is not defined in the correspondence relationship information 70 stored in the HMD storage unit 25 as an unsupported button image. For example, the HMD control unit 24 regards the target button B (software button SB) displayed on the target operation panel 40 as a determination target of the unsupported button determination process.

As a result of performing the unsupported button determination process, in case where there is the button image 100 determined as the unsupported button image, the HMD control unit 24 controls the display unit 21 to display the button image 100 determined as the unsupported button image so as not to overlap the target button B. For example, the display unit 21 displays the button image 100 determined as the unsupported button image by the HMD control unit 24 outside the area (outside the contour) of the target operation panel 40. In this way, the user recognizes that the button corresponding to the button image 100 displayed outside the area of the target operation panel 40 (unsupported button image) among the buttons on the user specified panel does not exist on the target operation panel 40.

Figure 8:
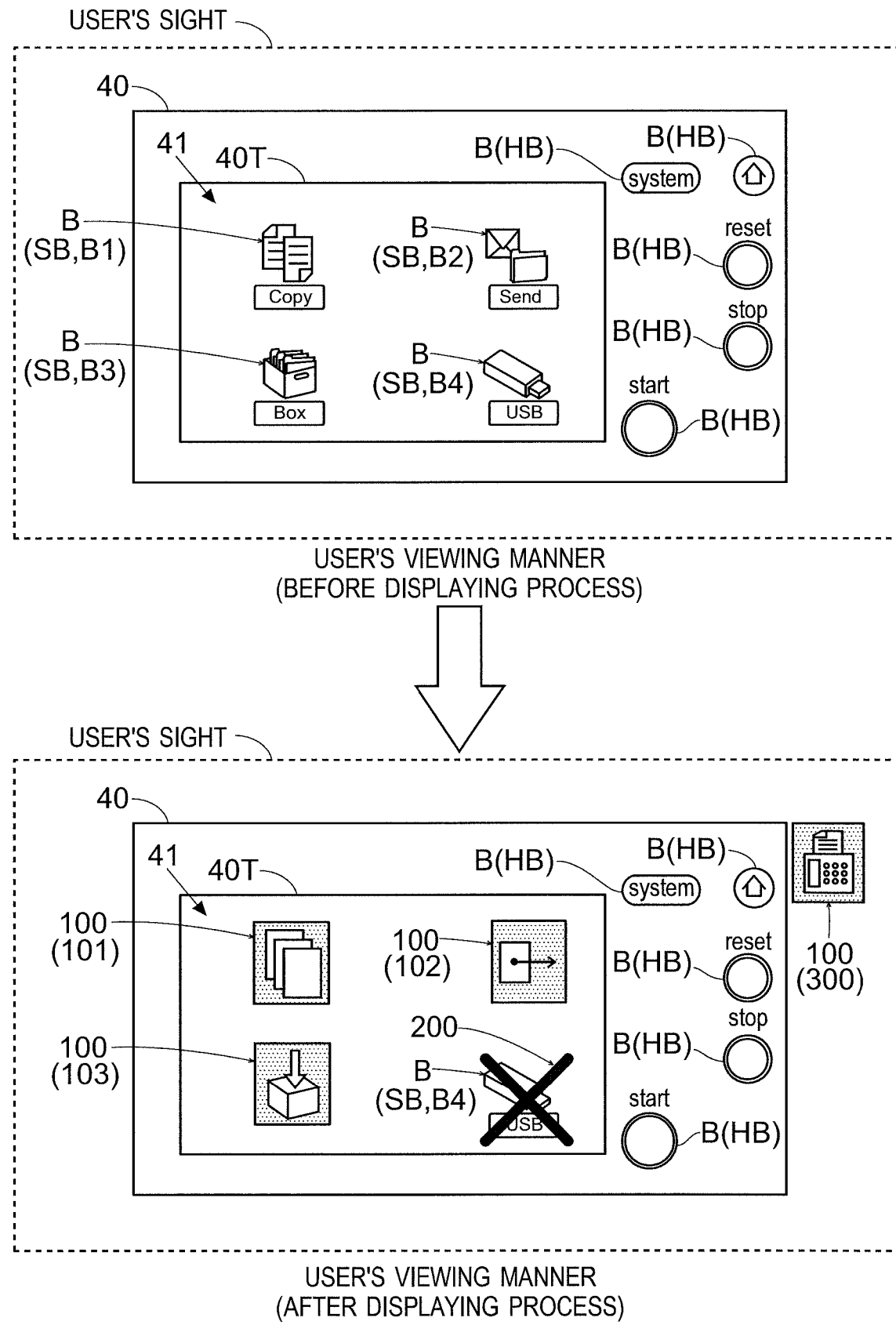
FIG. 8 is a diagram showing a user's viewing manner when the display system according to one embodiment of the present disclosure is performing the displaying process.

For example, it is supposed that the HMD control unit 24 performs the unsupported button determination process based on the correspondence relationship information 70 shown in FIG. 5. In this case, the button image 100 simulating a facsimile function button existing on the user specified panel is determined as the unsupported button image by the HMD control unit 24. In the following description, the button image 100 is referred to as an unsupported button image 300. Then, the display seen by the user is changed as shown in FIG. 8. In FIG. 8, the user's sight is shown by a broken line.

In a stage before the displaying process is performed by the HMD control unit 24, as shown in the upper part of FIG. 8, the user sees the target buttons B existing on the target operation panel 40 as they are. After that, the HMD control unit 24 performs the displaying process, and then as shown in the lower part of FIG. 8, the unsupported button image 300 is displayed outside the area of the target operation panel 40. FIG. 8 shows an example in which the unsupported button image 300 is displayed outside the area of the target operation panel 40, but the display position of the unsupported button image 300 is not particularly limited as long as it is a position that does not overlap the target button B.

Note that the unsupported button determination process may not be performed. In other words, the unsupported button image 300 may not be displayed. The lower part of FIG. 8 shows one example in which the button image 100, the notification image 200 and the unsupported button image 300 are displayed.

(Function Image Display)

The HMD storage unit 25 stores display data of a function image 400 (see the lower part of FIG. 9) indicating a function assigned to the hardware button HB among the target buttons B existing on the target operation panel 40 (hereinafter referred to as a target hardware button HB). For example, the display data of the function image 400 is generated by the panel operation support service provider in advance. Further, when the correspondence relationship information 70 is sent from the server 3 to the HMD 2, the display data of the function image 400 is also sent to the HMD 2. In addition, the HMD storage unit 25 stores information indicating a correspondence relationship between the target hardware button HB and the function image 400. This information is included in the correspondence relationship information 70.

Figure 9:
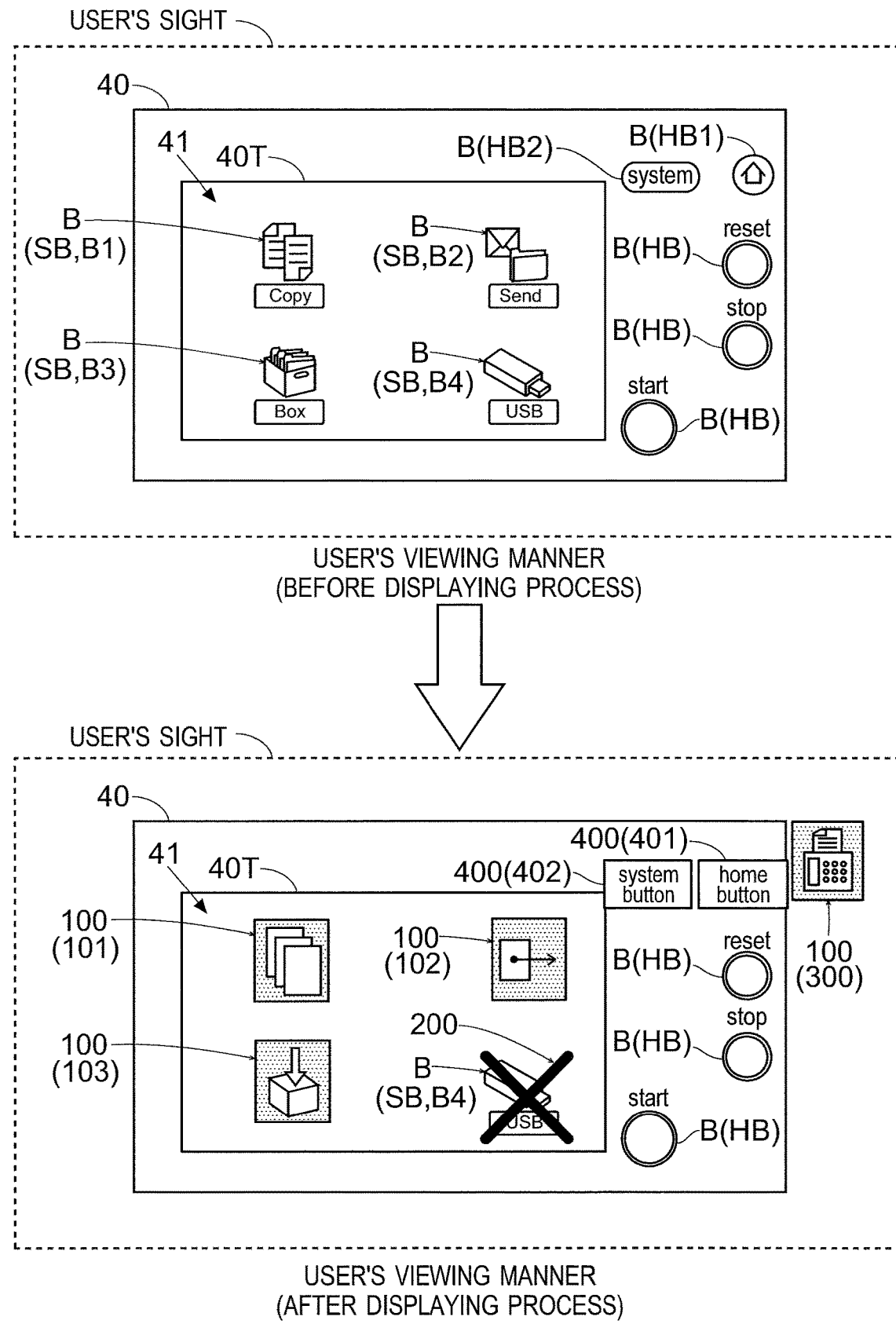
FIG. 9 is a diagram showing a user's viewing manner when the display system according to one embodiment of the present disclosure is performing the displaying process.

A displaying process of the function image 400 is described below with reference to FIG. 9. In this description, it is supposed that there are function images 400 corresponding to the home button and the system button, respectively. Note that in FIG. 9 the home button and the system button are denoted by symbols HB1 and HB2, respectively. In addition, the function image 400 corresponding to the home button HB1 is denoted by numeral 401, and the function image 400 corresponding to the system button HB2 is denoted by numeral 402.

When there are the function images 401 and 402 corresponding to the home button HB1 and the system button HB2, respectively, the HMD control unit 24 controls the display unit 21 to display the function image 401 so as to overlap the home button HB1 and display the function image 402 so as to overlap the system button HB2. A shape and a color of the function image 400 are not particularly limited. For example, the function image 400 may be a text image expressing the content of the corresponding function with text. Alternatively, a mark expressing the content of the corresponding function may be determined in advance, and the function image 400 may be an image of the mark (see FIG. 10).

Figure 10:
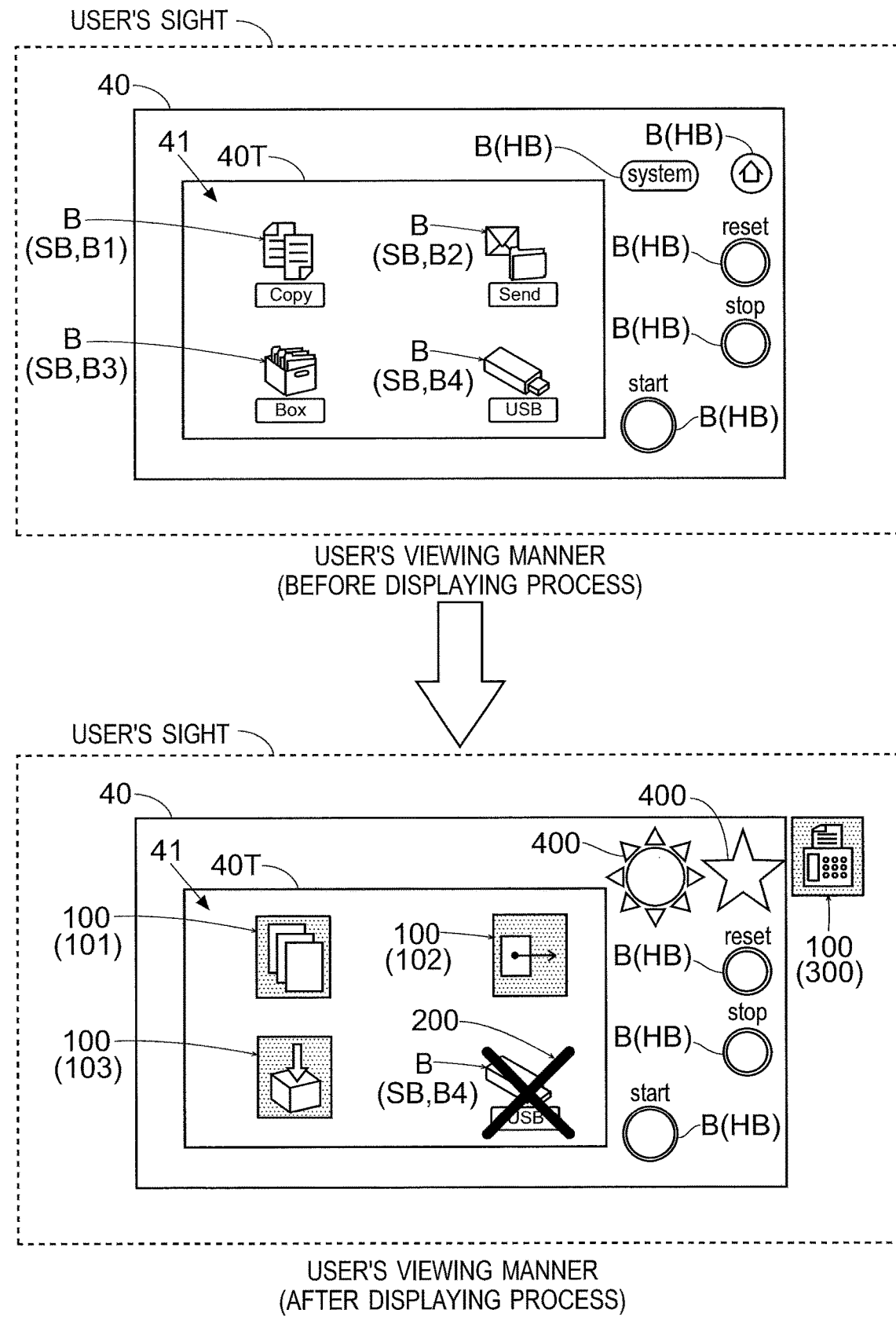
FIG. 10 is a diagram showing a user's viewing manner when the display system according to one embodiment of the present disclosure is performing the displaying process.

Note that the display of the function image 400 may not be performed. FIGS. 9 and 10 show examples in which the button image 100, the notification image 200, the unsupported image 300, and the function image 400 are displayed.

(Display after Screen Change)

After performing the displaying process for controlling the display unit 21 to display the button image 100 and the like, the HMD control unit 24 determines whether or not the target operation panel 40 has performed a screen change. For example, the HMD control unit 24 controls the camera unit 22 to take an image during display of the button image 100, and determines whether or not the target operation panel 40 has performed the screen change based on the imaged data obtained by the imaging. Alternatively, the HMD control unit 24 communicates with the image forming apparatus 4 (target operation panel 40), and determines whether or not the target operation panel 40 has performed the screen change, based on a screen change notification sent from the image forming apparatus 4 to the HMD 2 when the target operation panel 40 performs the screen change.

When determining that the target operation panel 40 has performed the screen change, the HMD control unit 24 temporarily stops the display of the button image 100 and the notification image 200 that is being performed by the display unit 21. Then, the HMD control unit 24 performs the displaying process again.

For example, it is supposed that the display screen on the target operation panel 40 is changed from the function selection screen 41 (see FIG. 2) to the item selection screen 42 (see FIG. 3). In this case, the HMD control unit 24 performs the first determination process and the second determination process again on the target buttons B (software buttons SB) existing on the item selection screen 42. Then, in case where the target button B determined as the first button exists on the item selection screen 42, the HMD control unit 24 controls the display unit 21 to display the button image 100 so as to overlap the target button B. In addition, in case where the target button B determined as the second button exists on the item selection screen 42, the HMD control unit 24 controls the display unit 21 to display the notification image 200 so as to overlap the target button B.

Note that when the target operation panel 40 has performed the screen change, the display of the unsupported button image 300 is not stopped but is continued. In the same manner, the display of the function image 400 also is not stopped but is continued. However, the displays of the unsupported button image 300 and the function image 400 may also be temporarily stopped and may be restarted when the button image 100 and the notification image 200 are displayed.

(Display Size Change)

The HMD control unit 24 controls the camera unit 22 to take an image during the display of the button image 100. Then, based on the imaged data obtained by imaging with the camera unit 22, the HMD control unit 24 determines whether or not a gesture operation (virtual operation of the button image 100) is performed, which is determined as a size changing operation in advance. As a result, in case where it is determined that the size changing operation has been performed, the HMD control unit 24 changes the display size of the button image 100 as an operation target of the size changing operation.

Although not particularly limited, when determining that a gesture corresponding to a pinch-out operation is performed on the button image 100, the HMD control unit 24 enlarges the display size of the button image 100 to be larger than the current display size. On the other hand, when determining that a gesture corresponding to a pinch-in operation is performed on the button image 100, the HMD control unit 24 reduces the display size of the button image 100 to be smaller than the current display size. For example, the display size of the button image 100 can be changed in three steps.

Figure 11:
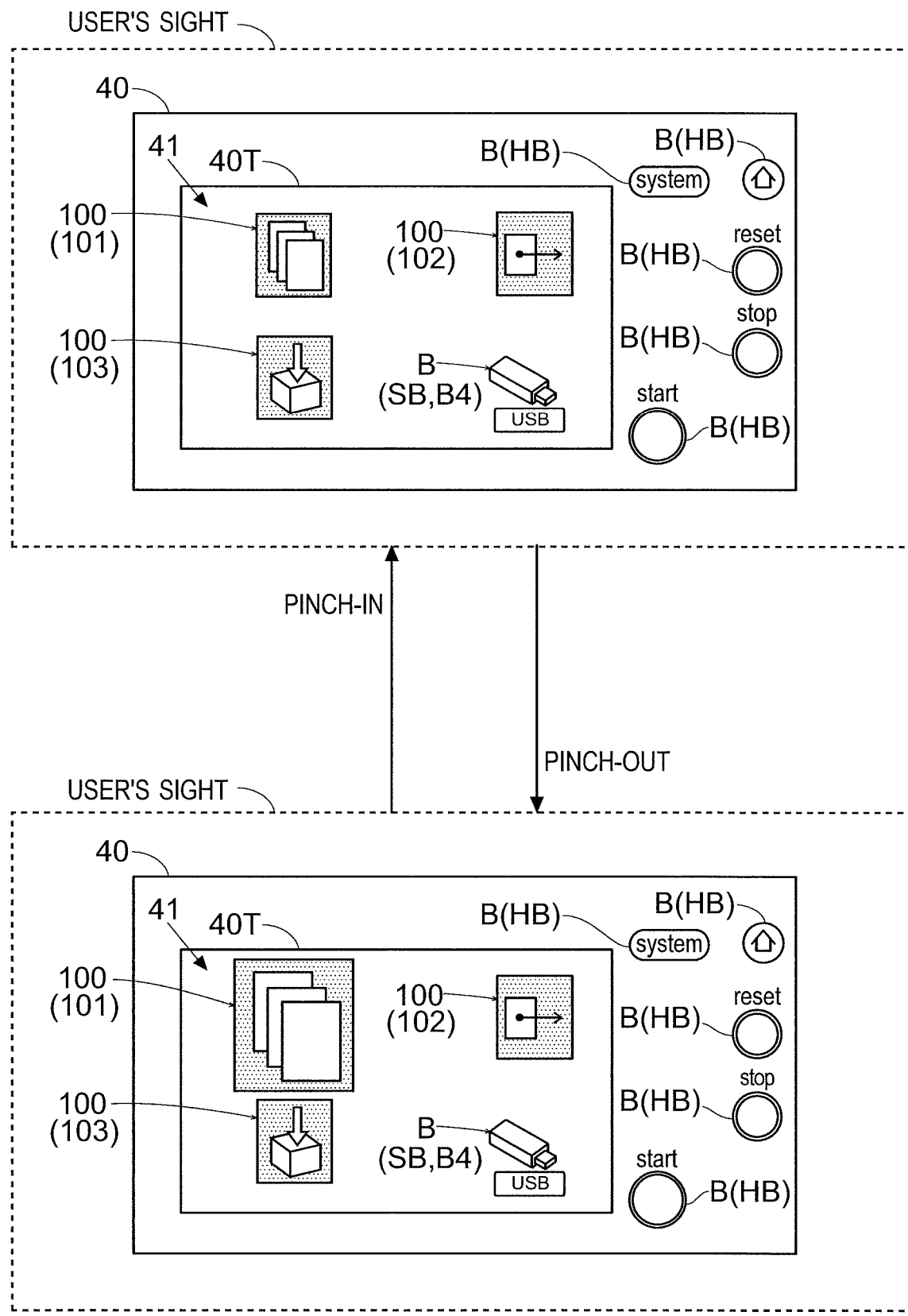
FIG. 11 is a diagram for describing a user's size changing operation received by the display system according to one embodiment of the present disclosure.

With reference to FIG. 11, a case where the button image 101 is the operation target of the size changing operation is exemplified and described below. When the pinch-out operation as the size changing operation is performed one time, the HMD control unit 24 enlarges the display size of the button image 101 by one step (the upper part in FIG. 11 is changed to the lower part in FIG. 11). In addition, when the pinch-in operation as the size changing operation is performed one time, the HMD control unit 24 reduces the display size of the button image 101 by one step (the lower part of FIG. 11 is changed to the upper part of FIG. 11). Note that when the pinch-out operation is performed on the button image 100 in the largest display size, the display size of the button image 100 is not changed. Further, when the pinch-in operation is performed on the button image 100 in the smallest display size, the display size of the button image 100 is not changed.

Note that also when the size changing operation is performed on the notification image 200, the unsupported button image 300, or the function image 400, the display size of the image as the operation target of the size changing operation may be changed. Alternatively, the size changing operation on the notification image 200, the unsupported button image 300, or the function image 400 may be disabled.

(Execution Instruction/Cancel Instruction of Process)

The HMD control unit 24 controls the camera unit 22 to take an image during the display of the button image 100. Then, based on the imaged data obtained by imaging with the camera unit 22, the HMD control unit 24 determines whether or not a gesture operation (virtual operation of the button image 100) determined as the button selecting operation in advance is performed. Although not particularly limited, a gesture corresponding to a tap operation is set as the button selecting operation.

When detecting the button selecting operation, the HMD control unit 24 sends to the image forming apparatus 4 (target operation panel 40) the execution instruction of the process about the function assigned to the target button B corresponding to the button image 100 selected by the button selecting operation. When receiving the execution instruction from the HMD 2, the image forming apparatus 4 (target operation panel 40) performs the process instructed by the HMD 2.

As one example, it is supposed that the button selecting operation is performed on the button image 101 corresponding to the target button B1 for receiving the function selecting operation (see FIGS. 6 to 10). The target button B1 is a button for changing the screen of the target operation panel 40 from the function selection screen 41 (see FIG. 2) to the item selection screen 42 (see FIG. 3). Therefore, when detecting the button selecting operation of the button image 101, the HMD control unit 24 sends to the image forming apparatus 4 (target operation panel 40) the screen change instruction from the function selection screen 41 to the item selection screen 42. In this way, the target operation panel 40 changes the display screen from the function selection screen 41 to the item selection screen 42.

As another example, although not shown, it is supposed that the target button B for receiving the execution instruction of the copy job exists on the target operation panel 40, and the button image 100 corresponding to the target button B is displayed. Then, it is supposed that the button selecting operation of the button image 100 is performed. In this case, the HMD control unit 24 first sends the execution instruction of the scan job to the image forming apparatus 4, controls the image forming apparatus 4 to scan a document, and obtains from the image forming apparatus 4 the image data obtained by scanning the document in the image forming apparatus 4. After that, the HMD control unit 24 sends to the image forming apparatus 4 the execution instruction of the print job together with the image data of the document, and controls the image forming apparatus 4 to perform printing of the image on a paper sheet based on the image data of the document.

Note that also when the button selecting operation is performed on the function image 400, the execution instruction of the process about the function assigned to the target button B (hardware button HB) corresponding to the function image 400 selected by the button selecting operation may be sent to the image forming apparatus 4 (target operation panel 40). In this structure, for example, when the button selecting operation is performed on the function image 401 corresponding to the home button HB1 (see FIG. 9) in a state where the target operation panel 40 is displaying the item selection screen 42, the screen change instruction from the item selection screen 42 to the function selection screen 41 (home screen) is sent from the HMD 2 to the image forming apparatus 4 (target operation panel 40). In this way, the target operation panel 40 changes the display screen from the item selection screen 42 to the function selection screen 41.

As shown in FIG. 8, the facsimile function button does not exist on the target operation panel 40 but exists on the user specified panel, and hence the button image 100 corresponding to the facsimile function button is displayed as the unsupported button image 300. However, for example, in case where the facsimile function button is a software button, despite that the image forming apparatus 4 has the facsimile function, the display of the facsimile function button may be intentionally stopped (the facsimile function button does not exist on the target operation panel 40).

In this case, the HMD control unit 24 does not disable the button selecting operation of the unsupported button image 300 corresponding to the facsimile function button. In other words, when detecting the button selecting operation of the unsupported button image 300 corresponding to the facsimile function button, the HMD control unit 24 sends the execution instruction of the process about the facsimile function to the image forming apparatus 4 (target operation panel 40). For example, the target operation panel 40 displays the setting screen of the facsimile function.

In addition, the HMD 2 may send to the image forming apparatus 4 (target operation panel 40) a cancel instruction to cancel a process that the image forming apparatus 4 is going to perform. For example, when the display size of a certain button image 100 is enlarged, in order to avoid overlapping between the certain button image 100 and another button image 100, the another button image 100 may be moved. As a result, the moved button image 100 may overlap a target button B different from the corresponding target button B.

For example, in the function selection screen 41, in case where the button image 102 corresponding to the target button B2 of the transmission function overlaps the target button B3 of the box function, a user who wants to select the transmission function may mistouch the target button B3 overlapping the button image 102. In this case, contrary to the user's intention, the screen about the box function (not shown) is displayed.

Therefore, in this case, the HMD control unit 24 sends the cancel instruction to the image forming apparatus 4 (target operation panel 40). When the image forming apparatus 4 receives the cancel instruction, the target operation panel 40 does not perform the screen change but continues to display the function selection screen 41. Note that in this case, the HMD 2 may send to the image forming apparatus 4 (target operation panel 40) the screen change instruction from the function selection screen 41 to the screen about the transmission function (not shown).

As described above, the HMD 2 (display device) included in the display system 1 of this embodiment includes the display unit 21 for displaying an image while enabling a user to see the target operation panel 40 to be actually operated by the user, the camera unit 22 for taking an image of the target operation panel 40 so as to output the imaged data of the target operation panel 40, the HMD storage unit 25 (storage unit) for storing display data of the button image 100 simulating a button existing on the user specified panel, as well as the correspondence relationship information 70 defining a correspondence relationship between the button image 100 and a target button B existing on the target operation panel 40, and the HMD control unit 24 (control unit) that recognizes the target button B based on the imaged data of the target operation panel 40, determines the target button B for which the corresponding button image 100 is defined in the correspondence relationship information 70 as a first button, and performs the displaying process of controlling the display unit 21 to display the button image 100 corresponding to the target button B determined as the first button so as to overlap the target button B.

In this embodiment, the button image 100 is displayed so as to overlap the target button B (first button) on the target operation panel 40. In this description, the button image 100 is an image simulating a button existing on the user specified panel. Therefore, when the operation panel accustomed to the user is specified as the user specified panel, the user sees as if the target button B (first button) is replaced with the accustomed button. In this way, operability of the target operation panel 40 can be improved. In addition, even when manufacturer or specification of the target operation panel 40 is different from that of the operation panel that is used before, the user is not required to memorize the function assigned to the target button B and the shape of the target button B (including the icon pattern) in association with each other, and hence good convenience can be achieved.

In addition, in this embodiment, as described above, when performing the displaying process, the HMD control unit 24 determines the target button B for which the corresponding button image 100 is not defined in the correspondence relationship information 70 as the second button, and controls the display unit 21 to display the notification image 200 so as to overlap the target button B determined as the second button. In this way, the user can recognize the button that exists on the target operation panel 40 but does not exist on the user specified panel.

In addition, in this embodiment, as described above, when performing the displaying process, the HMD control unit 24 determines the button image 100 for which the corresponding target button B is not defined in the correspondence relationship information 70 as the unsupported button image, and controls the display unit 21 to display the button image 100 determined as the unsupported button image (300) so as not to overlap the target button B. In this way, the user can recognize the button that does not exist on the target operation panel 40 among the buttons on the user specified panel.

In addition, in this embodiment, as described above, when performing the displaying process, the HMD control unit 24 controls the display unit 21 to display the function image 400 corresponding to the target hardware button HB so as to overlap the target hardware button HB. In this way, the user can recognize the function assigned to the target hardware button HB.

In addition, in this embodiment, as described above, after controlling the display unit 21 to display the button image 100, the HMD control unit 24 performs the displaying process again when the target operation panel 40 has performed the screen change. In this way, also after the target operation panel 40 changes the screen, the user sees as if the target button B (first button) is replaced with the accustomed button.

In addition, in this embodiment, as described above, the HMD control unit 24 controls the camera unit 22 to take an image during the display of the button image 100, and determines whether or not a gesture operation defined as the size changing operation in advance is performed, based on the imaged data obtained by imaging with the camera unit 22 during the display of the button image 100. When determining that the size changing operation is performed, the HMD control unit 24 changes the display size of the button image 100. In this way, the display size of the button image 100 can be arbitrarily changed, and hence convenience for the user is improved.

In addition, in this embodiment, as described above, the HMD control unit 24 controls the camera unit 22 to take an image during the display of the button image 100, and determines whether or not a gesture operation defined as the button selecting operation in advance is performed, based on the imaged data obtained by imaging with the camera unit 22 during the display of the button image 100. When determining that the button selecting operation is performed, the HMD control unit 24 sends to the image forming apparatus 4 (target operation panel 40) the execution instruction of the process about the function assigned to the target button B corresponding to the button image 100 selected in the button selecting operation. In this way, it is not necessary to actually operate the target operation panel 40, and hence convenience for the user is improved.

In addition, in this embodiment, as described above, the server 3 stores the panel information 60 indicating feature points of a plurality of types of registered operation panels as well as the correspondence relationship information 70 for each of the types of registered operation panels. Then, the HMD control unit 24 extracts a feature point of the target operation panel 40 from the imaged data of the target operation panel 40, sends to the server 3 a request to send the correspondence relationship information 70 corresponding to the registered operation panel having the same feature point as the target operation panel 40 among the plurality of types of registered operation panels, and performs the displaying process based on the correspondence relationship information 70 received from the server 3. In this way, without user's recognition of manufacturer or specification of the target operation panel 40 (without inputting information about the target operation panel 40 to the HMD 2), the displaying process is automatically performed based on the correspondence relationship information 70 corresponding to the target operation panel 40, and hence good convenience for the user can be achieved.

The embodiment disclosed in this specification is merely an example in every aspect and should not be interpreted as a limitation. The scope of the present disclosure is defined not by the above description of the embodiment but by the claims, and includes all modifications within meanings and scopes equivalent to the claims.

For example, the panel information 60 and the database DB are stored in the server 3 in the embodiment described above, but the present disclosure is not limited to this. The panel information 60 and the database DB may be stored in the HMD storage unit 25 in advance, so that the server 3 can be eliminated.

In this case, the HMD control unit 24 extracts a feature point of the target operation panel 40, recognizes the registered operation panel having the same feature point as the target operation panel 40 based on the panel information 60, extracts the correspondence relationship information 70 corresponding to the recognized registered operation panel from the database DB, and performs the displaying process based on the extracted correspondence relationship information 70. In other words, the HMD control unit 24 performs the process that the server 3 performs in the above structure.

In addition, the above embodiment describes the example in which the HMD 2 is used as the "display device", but a smartphone or a tablet terminal may be used instead of the HMD 2.

In addition, the image simulating the software button SB is displayed as the button image 100 in this embodiment, but in addition to that, the button image simulating the hardware button HB may also be displayed.

What is claimed is:

1. A display device comprising:
a display unit for displaying an image while enabling a user to see a target operation panel that is an operation panel to be actually operated by the user;
a camera unit for taking an image of the target operation panel so as to output imaged data of the target operation panel;
a storage unit for storing display data of a button image simulating a button existing on a user specified panel that is an operation panel specified by the user, as well as correspondence relationship information defining a correspondence relationship between the button image and a target button that is a button existing on the target operation panel; and
a control unit that recognizes the target button based on the imaged data of the target operation panel, determines the target button for which the corresponding button image is defined in the correspondence relationship information as a first button, and performs the displaying process of controlling the display unit to display the button image of the first button so as to overlap the first button,
wherein
the storage unit stores notification image display data for notifying the user that a button that does not exist on the user specified panel exists on the target operation panel, and
when performing the displaying process, the control unit determines the target button for which the corresponding button image is not defined in the correspondence relationship information as a second button, and controls the display unit to display the notification image so as to overlap the second button,
when performing the displaying process, the control unit determines the button image for which the corresponding target button is not defined in the correspondence relationship information as an unsupported button image, and controls the display unit to display the unsupported button image so as not to overlap the target button, and
the display unit displays the unsupported button image outside a contour of the target operation panel.

2. The display device according to claim 1, wherein
the storage unit stores function image display data indicating a function assigned to a target hardware button that is the target button disposed on the target operation panel as a hardware button as well as the correspondence relationship information including information defining a correspondence relationship between the function image and the target hardware button,
when performing the displaying process, the control unit controls the display unit to display the function image corresponding to the target hardware button so as to overlap the target hardware button, and either
- a text image expressing content of the function is taken as the function image, or
- a mark expressing the content of the function is determined in advance and an image of the mark is taken as the function image.

3. The display device according to claim 1, wherein after the control unit controls the display unit to display the button image, when the target operation panel performs screen change, the control unit performs the displaying process again.

4. The display device according to claim 1, wherein
the control unit controls the camera unit to take an image during the display of the button image, determines whether or not a gesture operation defined as a size changing operation in advance is performed based on the imaged data obtained by imaging with the camera unit during the display of the button image, and changes a display size of the button image when determining that the size changing operation is performed, and
if the button image of which the display size is enlarged overlaps another button image, the control unit moves the another button image.

5. The display device according to claim 1, wherein the control unit controls the camera unit to take an image during the display of the button image, determines whether or not a gesture operation defined as a button selecting operation in advance is performed based on the imaged data obtained by imaging with the camera unit during the display of the button image, and sends to the target operation panel an execution instruction of a process about the function assigned to the target button corresponding to the button image selected in the button selecting operation, when determining that the button selecting operation is performed.

6. The display device according to claim 1, wherein
the storage unit stores panel information indicating feature points of a plurality of types of registered operation panels each of which is an operation panel registered in advance, as well as the correspondence relationship information for each of the types of registered operation panels, and
the control unit extracts a feature point of the target operation panel from the imaged data of the target operation panel, recognizes the registered operation panel having the same feature point as the target operation panel among the plurality of types of registered operation panels based on the panel information, and performs the displaying process based on the correspondence relationship information corresponding to the recognized registered operation panel.

7. A display system comprising:
the display device according to claim 1; and
a server connected to the display device in a communicable manner, the server storing panel information indicating feature points of a plurality of types of registered operation panels each of which is an operation panel registered in advance, as well as the correspondence relationship information for each of the types of registered operation panels, wherein
the control unit extracts a feature point of the target operation panel from the imaged data of the target operation panel, sends to the server a request to send the correspondence relationship information corresponding to the registered operation panel having the same feature point as the target operation panel among the plurality of types of registered operation panels, and performs the displaying process based on the correspondence relationship information received from the server.

* * * * *